May 26, 1931.  H. H. MORETON  1,806,701
OIL FILTER
Filed Oct. 8, 1928
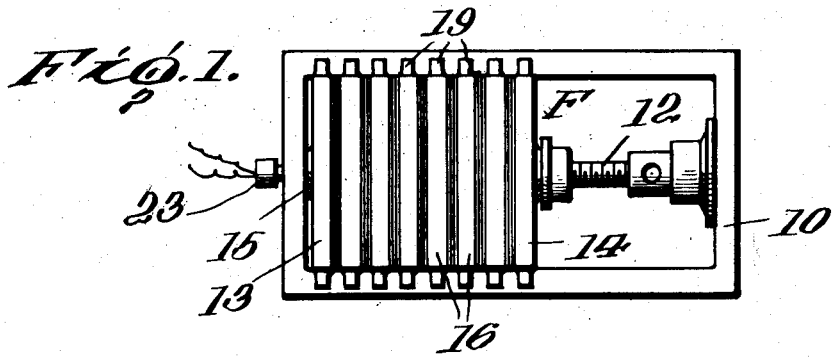
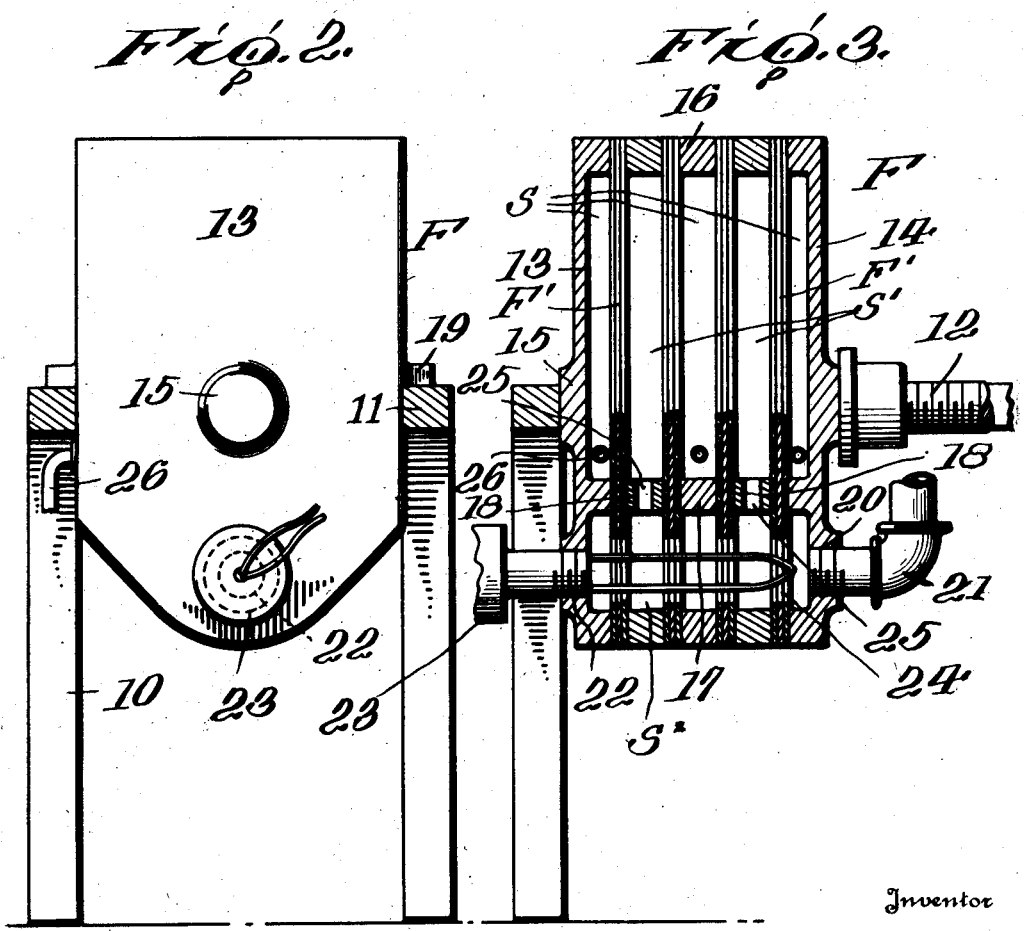
Inventor
Henry H. Moreton
By
Attorney Patented May 26, 1931

1,806,701

UNITED STATES PATENT OFFICE

HENRY H. MORETON, OF SANTA MONICA, CALIFORNIA, ASSIGNOR OF ONE-THIRD TO O. B. ENGLISCH, OF CHICAGO, ILLINOIS, AND ONE-THIRD TO CHARLES F. CRAIG, OF LOS ANGELES, CALIFORNIA

OIL FILTER

Application filed October 8, 1928. Serial No. 311,249.

This invention is a filtering apparatus of the filter press type.

One of the objects of the invention is to provide a device of simple and inexpensive construction, with the filter units so arranged as to obtain a maximum filtering operation in a minimum of time. A further object is to provide a filter-press structure primarily adapted for use in filtering oils, but not limited to such use. A further object is to provide means for heating the material to be filtered during the filtering operation.

The invention will be hereinafter fully set forth and particularly pointed out in the claims.

In the accompanying drawings,

Figure 1 is a top plan view diagrammatically illustrating a filter press constructed in accordance with the invention. Figure 2 is a side elevation thereof. Figure 3 is a vertical sectional view.

Referring to the drawings, 10 designates a supporting stand or table of any desired construction, provided with a frame 11, in which the filter units F are retained. Pressure is applied to maintain said units in assembled relation by means of a suitable jack conventionally illustrated at 12. Each filter unit consists of two separable casing members 13 and 14 respectively, each provided with an abutment surface 15 to be engaged by the jack 12. Interposed between the casing members 13 and 14 and maintained in spaced relation with respect thereto and with respect to each other, are a plurality of relatively spaced filter elements F'. These elements are maintained in spaced relation by means of open spacer frames having transversely disposed upper and lower end portions 16 positioned to be interposed between the correspondingly located portions of adjacent filter units, said end portions being connected by sides or stiles which maintain the vertical edges of the filter units in properly spaced relation. Some of said spacer frames are provided with partition members 17 and others with similar partition members 18, all of said partition members being located between the upper and lower end portions 16, and extended transversely the full width of the frame. The arrangement is such that while the elements of the filter units are assembled, said partition members cooperate with the filter elements to divide the spaces between adjacent filter elements, and between the casing members and filter elements adjacent thereto, into a supply compartment S and a plurality of filter compartments S'. The casing members 13 and 14 and the spacer frames are each provided with suitable lugs 19 by means of which they may be supported by the frame 11.

The casing member 14 is provided with an inlet opening 20 connected with a suitable supply pipe 21. The casing member 13 is provided with an opening 22 in which is removably supported an electrical heating unit 23. It will be observed that the filter units F' are each provided with openings 24 through which the heating unit 23 may be projected, so as to heat the material as it is supplied by the pipe 21. It will be observed that the alternate separating walls 18 are each provided with a passage 25 to establish communication between the compartments S and $S^2$, and the other alternate chambers S have their filter compartments provided with outlets 26, through which the filtered material is allowed to drain off, so that it may be conducted to any suitable storage receptacle, in a manner which is not illustrated because it forms no part of the invention.

Each filter unit F' may be constructed of any suitable or desired material, but it is preferred to construct it of a plurality of plates 30 of thin perforated metal such as tin, with interposed sheets of heavy filter paper 31. The holes or perforations in the metal sheets must be small enough to resist the tendency of forcing the paper through them. In operation, the desired number of filter units F' having been assembled between the units 13 and 14, the jack 12 is operated to clamp them together in sufficiently tight relation to prevent leakage, in a manner well understood in the art. The material to be filtered, such as oil for instance, is introduced through the pipe 21 and passes through the openings 20 and 24 into the lower compartments S². It will then travel upwardly through the passages 25, the filtering action taking place through the units F' which form the walls of the filter chambers, and passing out through the passages 26. It will be observed that the material is supplied at the bottom of the apparatus and must move upwardly so as to cause the filtering operation to take place at the upper portion of the apparatus. The heating unit 23 performs the functions of not only heating the material as it is introduced, but in the case of oil it sets up an agitation of the material, which tends to precipitate the impurities which are to be removed, and thereby greatly enhancing the filtering operation.

The advantages of the invention will be readily understood by those skilled in the art to which it belongs. It will be particularly observed that a very simple and inexpensive form of filter press is provided, by means of which the filtering operation is efficiently and quickly carried out and in which simple provision is made for introducing heat during the filtering operation.

Having thus explained the nature of the invention and described an operative manner of constructing and using the same, although without attempting to set forth all of the forms in which it may be made, or all of the forms of its use, what is claimed is:—

1. A filter of the character described comprising two spaced apart casing members, a plurality of filter elements independent of the casing members and of each other, and a plurality of open spacer frames interposed between the edges of adjacent filter elements, each spacer frame having spacer members at its upper and lower ends, and a partition member located between said spacer members, said spacer and partition members extending transversely the full width of the frame, said partition members cooperating with said filter elements to provide chambers above the partition members on opposite sides of each filter unit, and to also provide a supply compartment below said partition members, alternate partition members having openings therein so as to establish communication between the supply compartment and the chambers between predetermined pairs of said filter elements, the other chambers having outlet openings.

2. A filter of the character described comprising two spaced apart casing members, a plurality of filter elements independent of the casing members and of each other, and a plurality of open spacer frames interposed between the edges of adjacent filter elements, each spacer frame having spacer members at its upper and lower ends, and a partition member located between said spacer members, said spacer and partition members extending transversely the full width of the frame, said partition members cooperating with said filter elements to provide chambers above the partition members on opposite sides of each filter unit, and to also provide a supply compartment below said partition members, alternate partition members having openings therein so as to establish communication between the supply compartment and the chambers between predetermined pairs of said filter elements, the other chambers having outlet openings, said filter elements having cut-out portions coinciding with said supply compartment so as to allow free flow of liquids beneath said partition members.

3. A filter of the character described comprising two spaced apart casing members, a plurality of filter elements independent of the casing members and of each other, and a plurality of open spacer frames interposed between the edges of adjacent filter elements, each spacer frame having spacer members at its upper and lower ends, and a partition member located between said spacer members, said spacer and partition members extending transversely the full width of the frame, said partition members cooperating with said filter elements to provide chambers above the partition members on opposite sides of each filter unit, and to also provide a supply compartment below said partition members, alternate partition members having openings therein so as to establish communication between the supply compartment and the chambers between predetermined pairs of said filter elements, the other chambers having outlet openings, said filter elements having cut-out portions coinciding with said supply compartment so as to allow free flow of liquids beneath said partition members, and a heating unit extending through the cut-away portions of the filter elements, so as to be submerged by liquid within said supply compartment.

In testimony whereof I have hereunto set my hand.

HENRY H. MORETON.